(12) United States Patent
LaRosa (10) Patent No.: US 10,687,567 B2
(45) Date of Patent: Jun. 23, 2020

(54) HAND AND FOREARM PROTECTOR FOR EGG COLLECTION

(71) Applicant: Nico Hawk LaRosa, Danbury, CT (US)

(72) Inventor: Nico Hawk LaRosa, Danbury, CT (US)

(*) Notice: Subject to any disclaimer, the term of this patent is extended or adjusted under 35 U.S.C. 154(b) by 0 days.

(21) Appl. No.: 16/114,481

(22) Filed: Aug. 28, 2018

(65) Prior Publication Data

US 2019/0059469 A1 Feb. 28, 2019

Related U.S. Application Data

(60) Provisional application No. 62/550,981, filed on Aug. 28, 2017.

(51) Int. Cl.
*A41D 13/08* (2006.01)
*A01K 31/16* (2006.01)

(52) U.S. Cl.
CPC .......... *A41D 13/084* (2013.01); *A01K 31/165* (2013.01)

(58) Field of Classification Search
CPC ....... A41D 3/084; A41D 3/081; A01K 31/165
USPC .......................... 2/16, 22, 59, 60, 66, DIG. 5
See application file for complete search history.

(56) References Cited

U.S. PATENT DOCUMENTS

| | | | | |
|---|---|---|---|---|
| 1,689,558 A | * | 10/1928 | Patten | A63B 71/1225 2/22 |
| 4,964,176 A | * | 10/1990 | Previdi | A41D 17/00 2/22 |
| 5,566,390 A | * | 10/1996 | Clancy | A41D 13/084 2/16 |
| 5,728,169 A | * | 3/1998 | Norvell | A61F 2/7812 2/22 |
| 6,298,484 B1 | * | 10/2001 | Beckman | A63B 71/1225 2/22 |
| 6,327,710 B1 | * | 12/2001 | Dunn | A41D 13/0543 2/22 |
| 6,421,830 B1 | * | 7/2002 | Reynolds | A61F 15/00 2/16 |
| 2006/0277641 A1 | * | 12/2006 | Gazaui | A41D 13/082 2/16 |
| 2008/0040838 A1 | * | 2/2008 | Watley | A41D 17/00 2/242 |
| 2009/0255027 A1 | * | 10/2009 | Laitmon | A41D 17/02 2/22 |
| 2012/0097649 A1 | * | 4/2012 | Dawson | A41D 13/084 219/121.64 |
| 2012/0269235 A1 | * | 10/2012 | Pratt | G01S 19/02 375/147 |
| 2015/0352583 A1 | * | 12/2015 | Anderson | A01M 7/0046 239/1 |

* cited by examiner

Primary Examiner — Gloria M Hale (57) ABSTRACT

An arm shield constructed from a thin sheet material has a curvature around an elongate axis. Opposite side edges are substantially parallel to the elongate axis. A nose edge extends from the first end. A tail curvature similar to the sheet curvature extends from the second end. An adjustable strap connects the first side edge to the second side edge.

20 Claims, 9 Drawing Sheets

HAND AND FOREARM PROTECTOR FOR EGG COLLECTION

CROSS-REFERENCE TO RELATED APPLICATION

This application claims priority to and the benefit of US Provisional Patent Application No. 62/550,981, filed Aug. 28, 2017, entitled NO PECKER EGG COLLECTOR, the disclosure of which is hereby incorporated by reference herein in its entirety.

INTRODUCTION

Those who regularly collect eggs from a nest box occupied by a laying hen, are well aware that they may be pecked by the laying hen while attempting to collect the eggs. A common solution to this problem is for the person collecting eggs to wear a relatively heavy gauntlet-style glove. Although the gauntlet-style glove will protect the person's arm, the covering over the hand and fingers makes it difficult to pick up and move the eggs. Eggs may be dropped and broken since the gloves cause a loss of sensitivity in the hand and fingers, and many of the gauntlet-style gloves are somewhat slippery. Further, gauntlet-style gloves may not be readily available in children's sizes.

SUMMARY

The present technology relates to protective wear and equipment, useful for protecting a user's body while performing a particular task. More specifically, the present technology relates to a device used to protect a user's forearm from being pecked by a hen, while collecting eggs from the hen's nest box.

In one aspect, the technology relates to an arm shield including: a thin sheet having an elongate axis, a first end, a second end opposite the first end, a first side edge substantially parallel to the elongate axis, and a second side edge substantially parallel to the elongate axis, wherein both the first side edge and the second side edge extend from the first end to the second end, wherein the thin sheet has a sheet curvature around the elongate axis, wherein the first end has a nose, wherein the elongate axis substantially penetrates a nose curvature defined by the nose, and wherein the second end has a tail curvature around the elongate axis that is substantially similar to the sheet curvature; and a strap connecting the first side edge to the second side edge, wherein the strap is configured to adjust a separation between the first side edge and the second side edge. In an example, the thin sheet is made of a plastic. In another example, the strap has a first enlarged end and a second enlarged end, wherein both the first enlarged end and the second enlarged end are disposed on sides of the thin sheet opposite the elongate axis. In yet another example, the thin sheet includes a waist between the first end and the second end. In still another example, the strap is substantially elastic.

In another example of the above aspect, the thin sheet is substantially translucent. In an example, the thin sheet is made of at least a portion of a bottle. In yet another example, the first end, second end, first side edge, and second side edge include a perimeter of the arm shield, and wherein the arm shield further includes a protector disposed along at least a portion of the perimeter. In still another example, the protector is disposed along an entirety of the perimeter. In another example, the protector includes an adhesive tape.

In another aspect, the technology relates to an arm shield having: a thin sheet defining a first curvature about an elongate axis, wherein the elongate axis is disposed on a bisecting plane wherein a first side portion of the thin sheet on a first side of the bisecting plane is a substantially mirror image of a second side portion of the thin sheet on a second side of the bisecting plane, and wherein the thin sheet includes: a tapered nose portion, wherein the tapered nose portion includes a second curvature of the thin sheet, wherein the second curvature is towards the elongate axis; a tail portion, wherein the tail portion includes only the first curvature; and a retention strap having a first end connected to a portion of the thin sheet on a first side of the bisecting plane and a second end connected to a portion of the thin sheet on a second side of the bisecting plane. In an embodiment, the thin sheet is substantially transparent. In another embodiment, the retention strap is elastic. In yet another embodiment, the thin sheet includes a waist between the tapered nose portion and the tail portion. In still another embodiment, the arm shield includes a shield height from a bottom edge to an uppermost extent, and wherein the retention strap is connected to the first side portion at a strap height disposed at least about one-quarter of the shield height measured from the bottom edge.

In another example of the above aspect, the arm shield includes a shield length from the nose portion to the tail portion, and wherein the retention strap is connected to the first side portion at a strap distance disposed at least about one-half of the shield length measured from the nose. In an example, the arm shield includes a perimeter and wherein the arm shield further includes a perimeter protector disposed along at least a portion of the perimeter. In another example, the perimeter protector is disposed along an entire length of the perimeter. In yet another example, the perimeter protector includes an adhesive tape. In still another example, the arm shield includes at least a portion of a plastic bottle.

DETAILED DESCRIPTION

Figure 1:
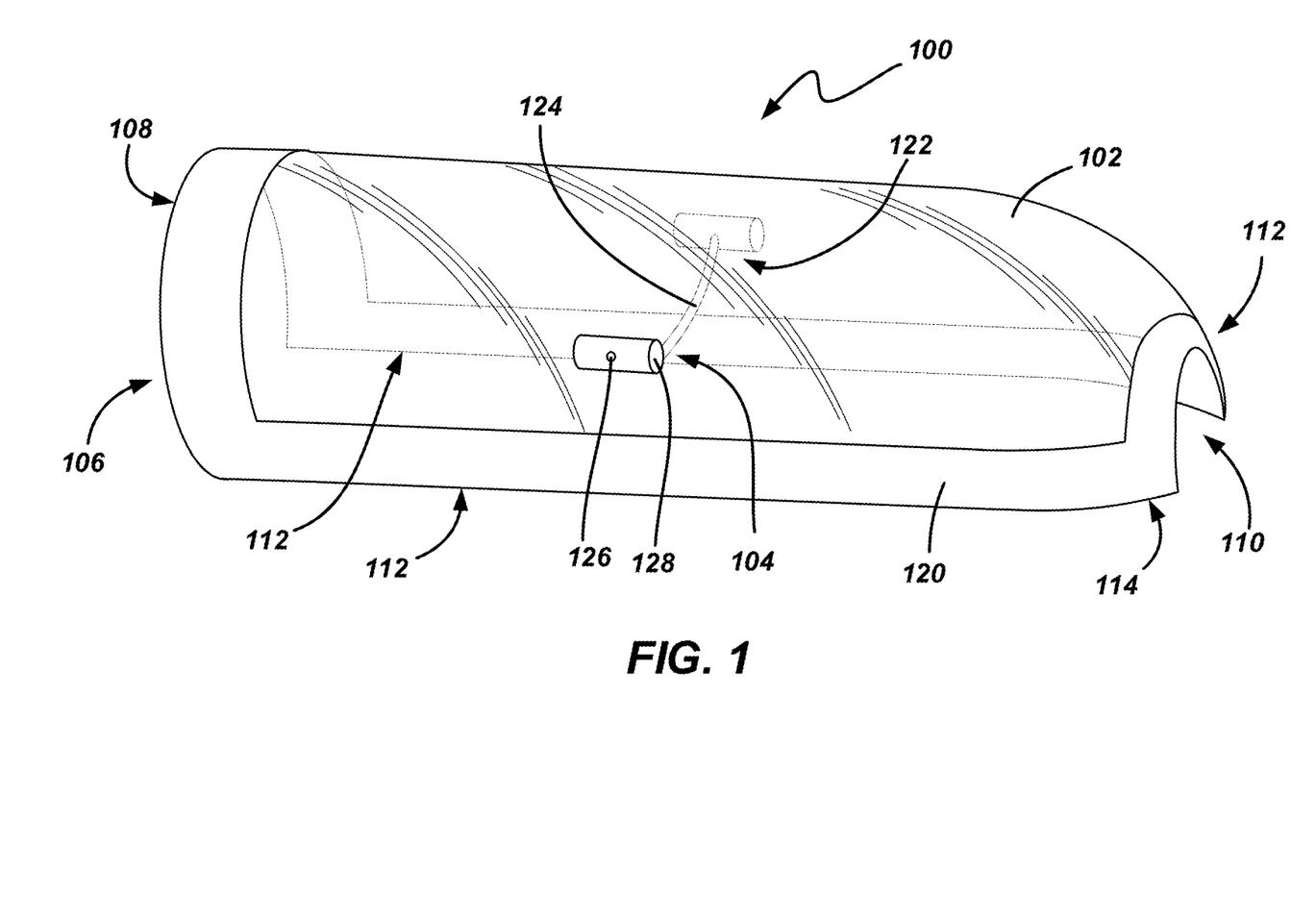
FIG. 1 is a side perspective view of a first example of an arm shield in accordance with the technology.

FIG. 1 is a side perspective view of an arm shield device 100. The body 102 of the device 100 is constructed of a thin sheet material having an elongate axis A. The first and second side edges 112 of the body 102 are substantially parallel to the elongate axis A and form a curvature around the elongate axis A. A large diameter opening 106 is disposed at a tail end 108, and a smaller diameter opening 110 is disposed at a nose end 112.

The edges of the plastic body 102 may be covered by paper or plastic tape 120. Duct tape may be used, or, in some embodiments, the edges may be painted with a rubber or polymer compound that will dull sharp edges to protect the user. Although the body 102 of the device 100 is transparent in this example, that is not a limitation or a requirement. The body 102 may be translucent or opaque and may be made of plastic or any other suitable material.

In an example, two holes 122 are disposed on opposite sides of the plastic body 102, proximate the side edges 112.

A fabric strap 124 is passed through the holes 122, and secured. In the example, the ends 126 of the fabric strap 124 are fastened to the body 102 with overhand knots or enlarged flanges 128. In other embodiments, snaps, buttons, hook and loop fasteners (as sold under the name VELCRO), or any other suitable fastener may be used to secure the fabric strap 124 so that the device 100 is securely cinched to the user's arm 104. (FIG. 3)

Figure 2:
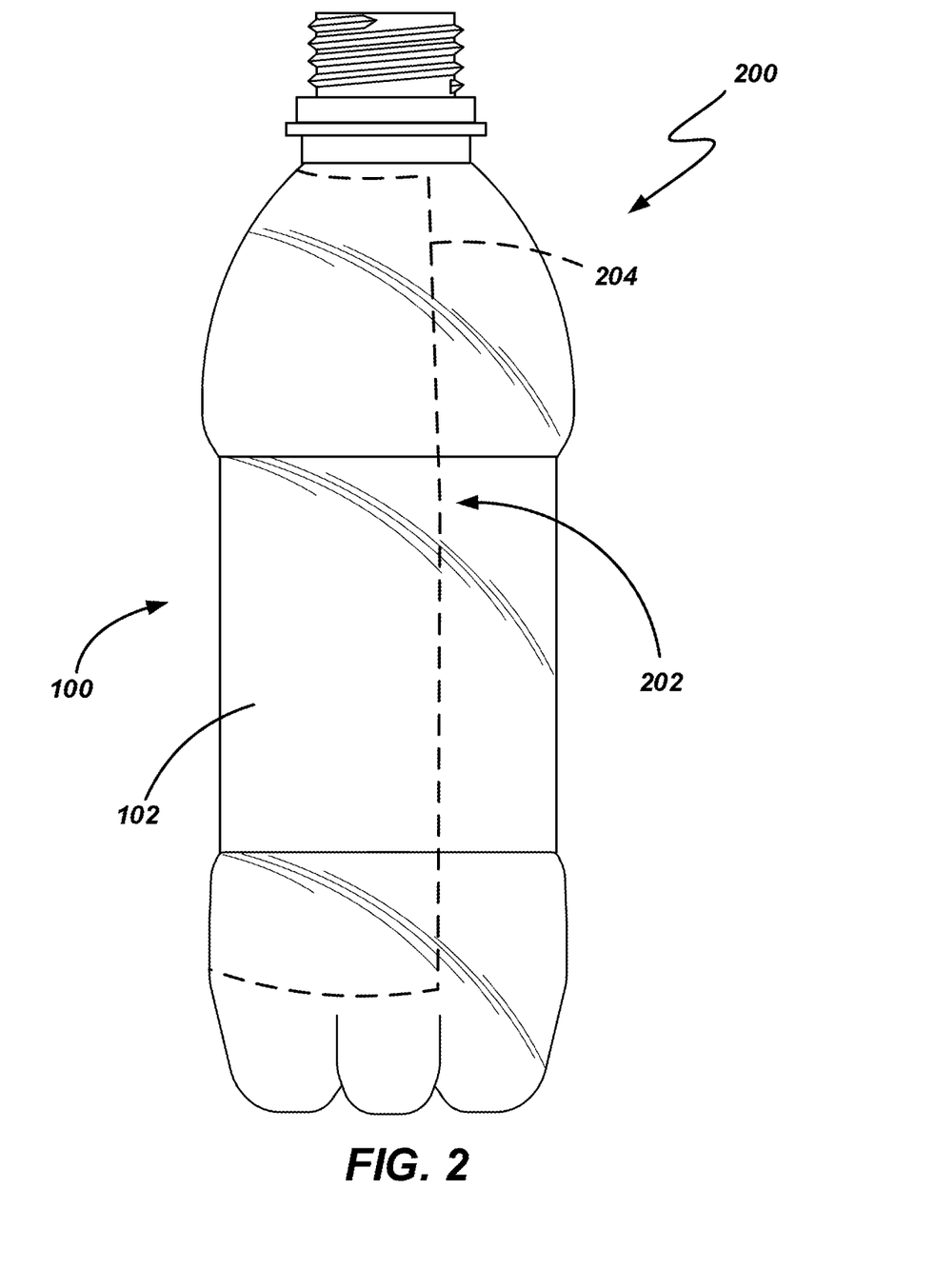
FIG. 2 depicts a method of manufacturing an arm shield.

FIG. 2 depicts a method 200 of manufacturing the device 100 from a plastic bottle 202. Suitable plastic bottles are readily obtained from a grocery store, for vending water, juices and the like. In this example, the plastic bottle 202, empty of liquid, has been cleaned and marked along a cut line, shown as a dotted line 204. Cutting along this line 206 will produce a plastic body 102 of device 100 as seen in FIG. 1. In some circumstances it is desirable that the lengthwise cut be made somewhat off center, so the circular cross section of the cut out will exhibit an arc of somewhat more than 180 degrees. This feature helps the body to engage the user's arm in practice.

Figure 3:
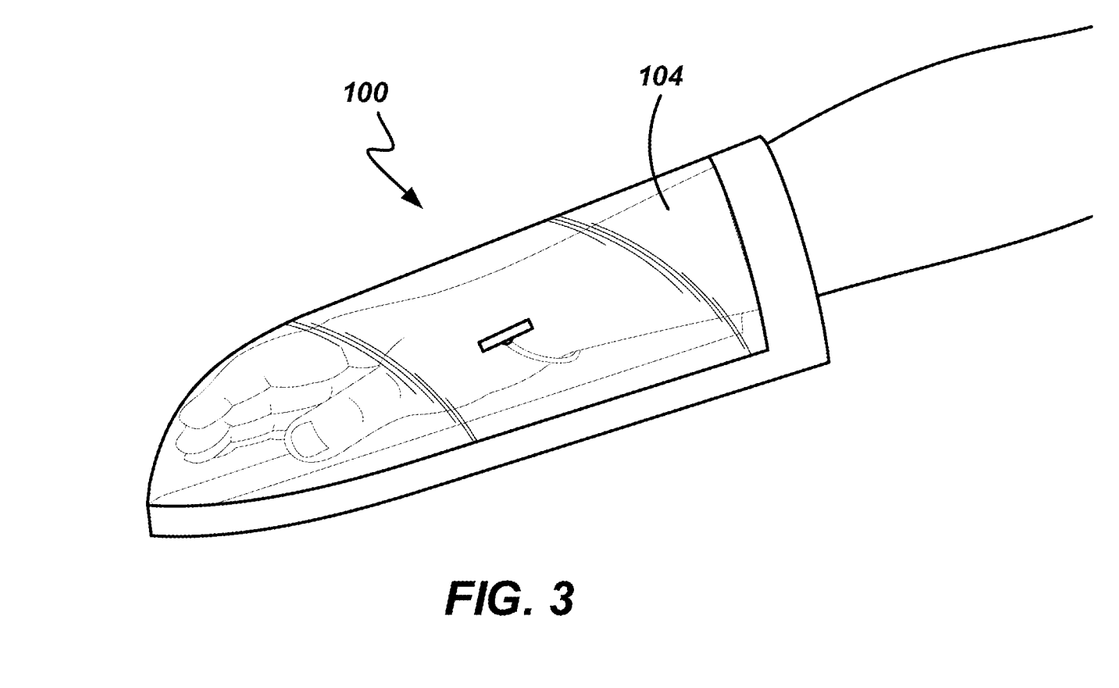
FIG. 3 depicts the arm shield of FIG. 1 as worn on an arm.

FIG. 3 is an illustration showing the arm shield device 100 of FIG. 1 in use. The device 100 fits over the user's arm 104. When the user extends his or her arm 104 into a nest box to retrieve eggs from under a hen in the nest box 306, the device 100 protects the user's arm 104 from attack by the hen.

FIGS. 4A-4F are various views of a second example of an arm shield 300 in accordance with the technology. FIGS. 4A-4F are described concurrently. As is clear from the figures, the example of FIGS. 4A-4F shares many similar features with the example of the above figures. As such, unless otherwise noted, the description of the features of the arm shield 300 of FIGS. 4A-4F is similarly applicable to the arm shield as depicted in the above figures.

The features of the arm shield 300 (as well as other arm shields described herein) may be described in the context of the complex shape of the arm shield 300. The arm shield 300 includes a body 302 that is manufactured from a thin sheet material so as to have an elongate axis A (generally, this allows the body 302 to extend along the forearm, wrist, and hand of a user during use). The body 302 is bounded by a perimeter and also includes a first end 306, a second end 308 opposite the first end 306, a first side edge 310 substantially parallel to the elongate axis A, and a second side edge 312 substantially parallel to the elongate axis A. Both the first side edge 310 and the second side edge 312 extend from the first end 306 to the second end 308. The thin sheet of the body 302 has a sheet curvature around the elongate axis A. This curvature may be substantially consistent along a majority of the length of the body (as depicted in FIG. 1 for example), or may include different curvatures, as depicted in FIGS. 4A-4F. The first end 306 may also be described as including a tapered nose that has a second curvature that is different than the sheet curvature and that extends down towards the elongate axis A. The elongate axis A substantially penetrates this second curvature defined by the nose 306. The second end 308 includes a tail curvature about the elongate axis that is substantially similar to the sheet curvature. This is more apparent in the device depicted in FIG. 1, but is also present in the device 300.

Figure 4A:
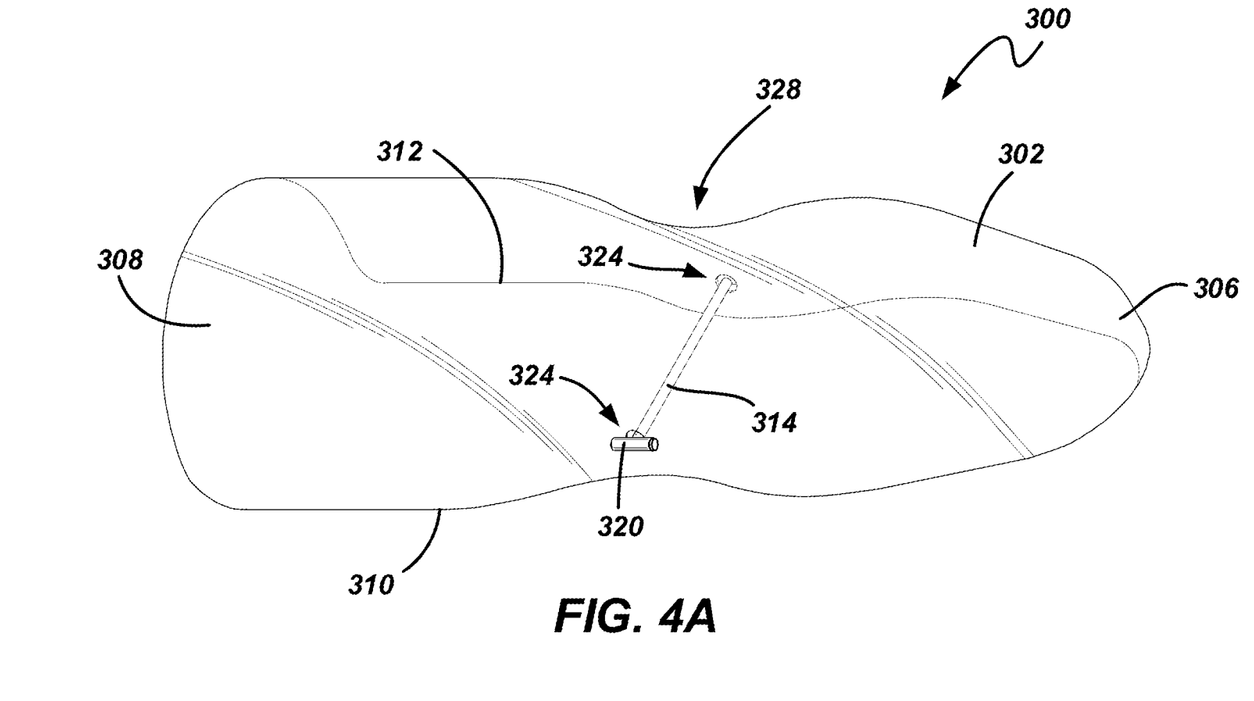
FIGS. 4A-4H are various views of a second example of an arm shield.
Figure 4B:
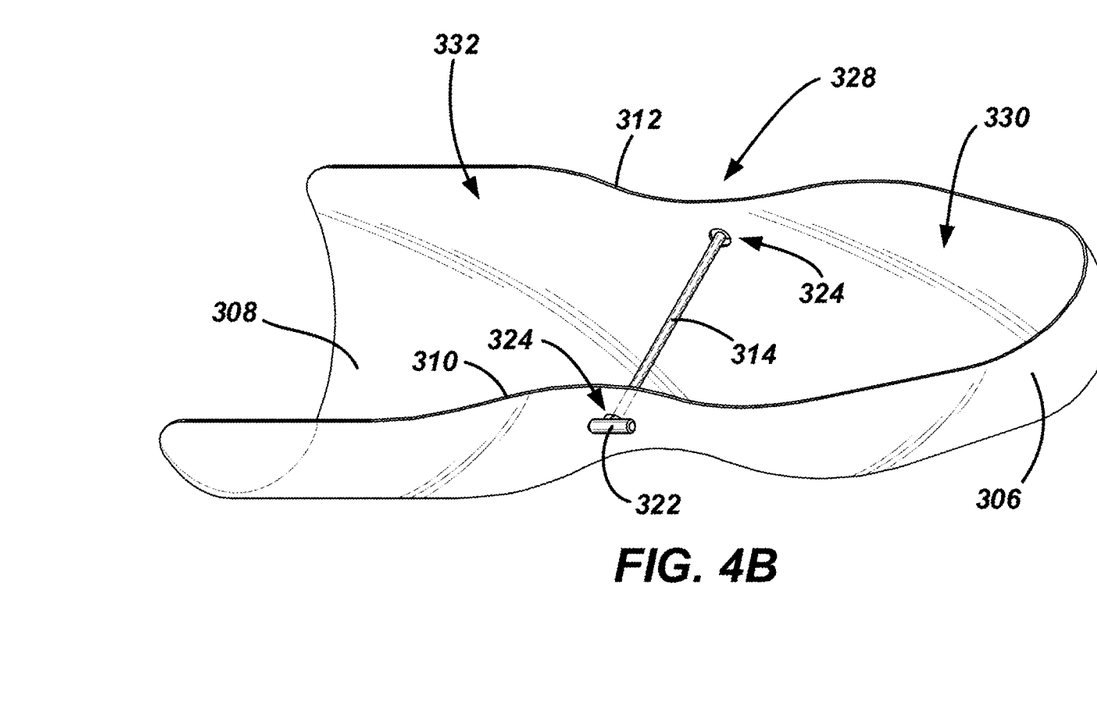
Figure 4C:
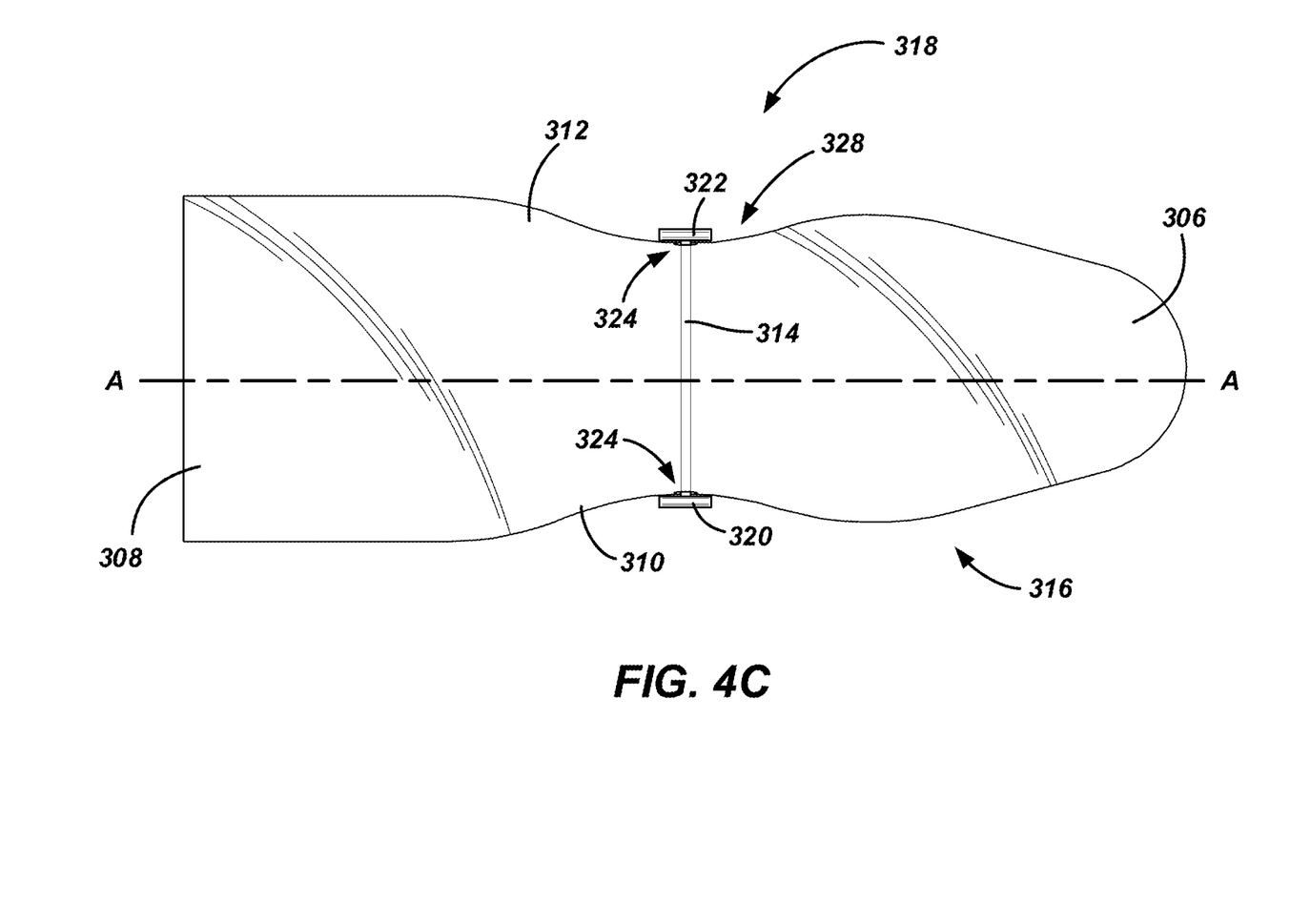
Figure 4D:
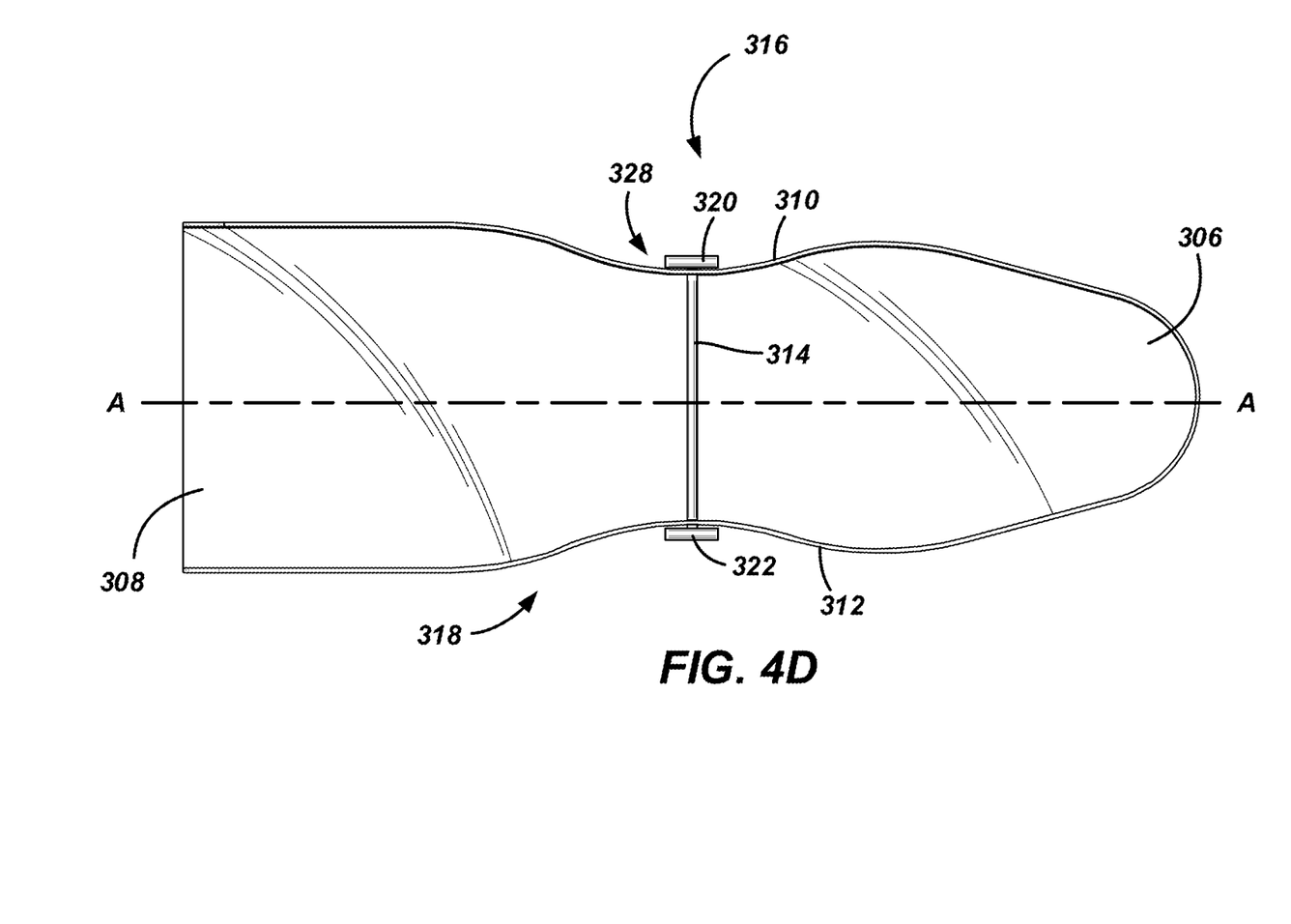
Figure 4E:
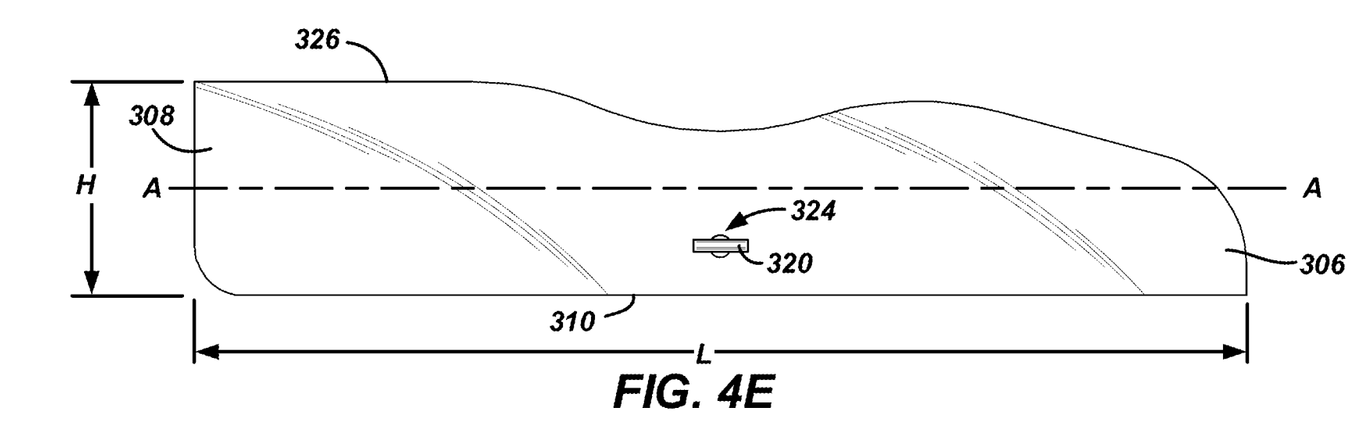
Figure 4F:
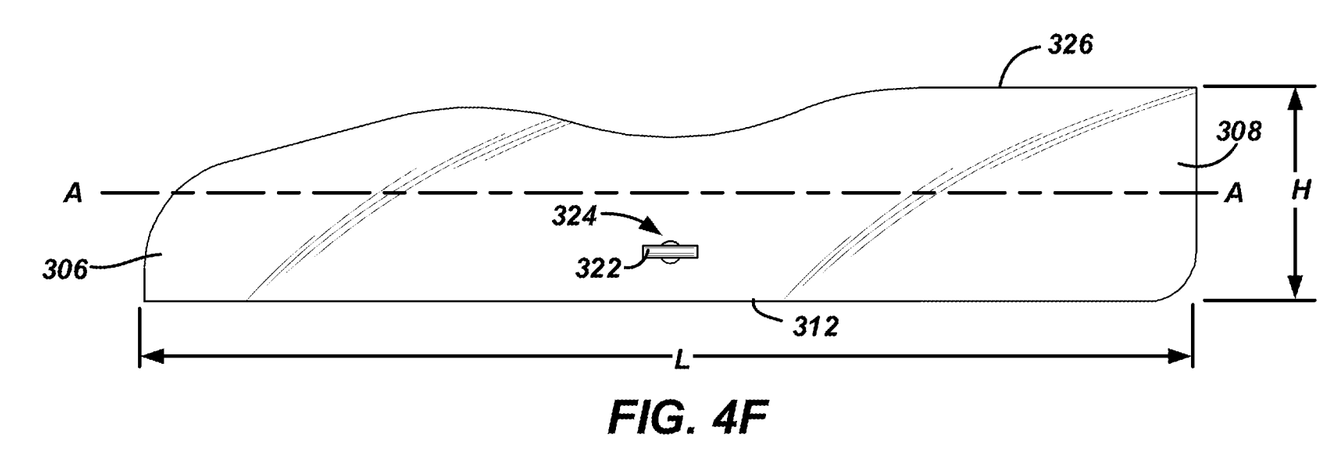
Figure 4G:
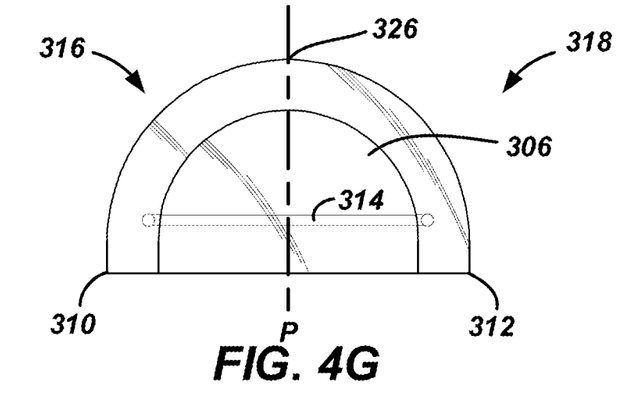
Figure 4H:
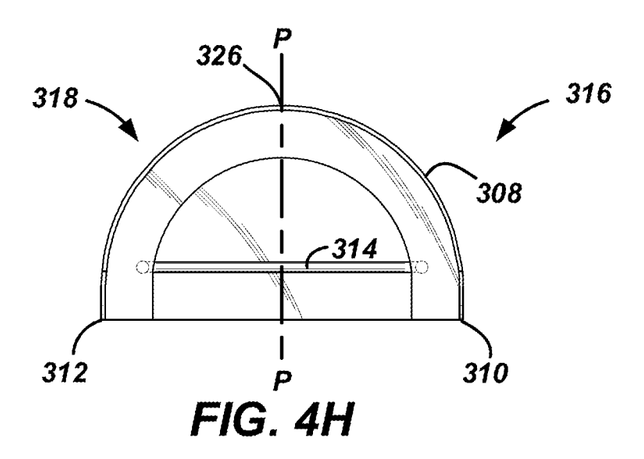

The arm shield 300 may also be characterized by its substantially symmetrical appearance. The thin sheet of the body 302 defining a first curvature about the elongate axis A, wherein the elongate axis A is disposed on a bisecting plane P. The first side portion or edge 310 is disposed on a first side 316 of the bisecting plane P. This first side edge 310 is a substantially mirror image of the second side portion or edge 312 that is disposed on a second side 318 of the bisecting plane P. (FIGS. 4G, 4H)

The arm shield 300 may be characterized by a shield height H and a shield length L. The height H may be measured from one of the side edge portions 310, 312 to an uppermost portion 326 of the arm shield 300. The height H may be measured from the nose 306 to the tail 308.

Unlike examples depicted elsewhere herein, the arm shield 300 includes a waist 328 between the nose 306 and the tail 308. The waist 328 is a location of reduced curvature (relative to the first curvature) and may be positioned along the length L of the arm shield 300 as required or desired. In an example, the waist 328 may be disposed so as to approximate the location of a wrist of a user. As such, an enlarged front void 330 may be positioned so as to allow manipulation of the hand, while the wrist may be held more tightly within the waist 328.

A retention strap 314 extends between and connects the first side edge 310 to the second side edge 312. In examples, the strap 314 may be adjustable so as to adjust (e.g., increase or decrease) a separation S between the first side edge 310 and the second side edge 312. The retention strap 314 has ant end 320 connected to a portion of the thin sheet 302 on the first side 316 of the bisecting plane P. Additionally, the retention strap 314 has a second end 322 connected to a portion of the thin sheet 302 on the second side 318 of the bisecting plane P. In examples, the retention strap 314 may be elastic, inelastic, and may be in the form of a string, a rope, a cable, or a chain. The retention strap 314 may be formed in two parts that may be tied together. In other examples, the retention strap 314 may have enlarged ends 320, 322, as depicted. In another example, the retention strap 314 may be a single loop of material that looped through openings 324 proximate either edge side 310, 312, with or without a knot or other fastening implement.

The retention strap 314 is connected to the first side portion 310 and the second side portion 312. The retention strap 314 may be connected at a strap height $H_S$ disposed at least about one-quarter of the shield height H measured from a bottom edge of the shield 300 as defined by the lower most extent of the first or second edge side 310, 312. In another example, the strap height may be about one-eighth of one-half the shield height H. Other strap heights $H_S$ are contemplated. Further, the retention strap 314 may be connected at a strap length $H_L$ disposed at least about one-half of the shield length L measured from the nose 306 to the tail 308 of the shield 300. Other strap lengths $H_L$ are contemplated.

The perimeter 304 of the arm shield 300 may be covered by a protective cover or cushion as depicted in FIGS. 1 and 3. In other examples, only a portion of the perimeter is covered. In examples, the protective cover may be an adhesive tape, foam, or smooth plastic having rounded edges.

The skilled person will understand that in alternative examples there may be many alterations to the examples described as examples in this application. Bodies of the device may be in different materials other than plastic, and sources for the body may be other than cutting from a plastic bottle. The cinch through the body of the device may be a rubber band or some other material. Devices in different examples may be opaque as well. Diameters lengths and other dimensions may vary. There are many such alterations that may be made within the scope of the technology.

What is claimed is:

1. An arm shield comprising:
    a sheet comprising an elongate axis, a first end, a second end opposite the first end, a first side edge substantially parallel to the elongate axis, and a second side edge substantially parallel to the elongate axis,
        wherein both the first side edge and the second side edge extend from the first end to the second end,
        wherein the sheet comprises a sheet curvature around the elongate axis when worn on an arm,
        wherein the first end comprises a nose,
        wherein the elongate axis substantially penetrates a nose curvature defined by the nose, and
        wherein the second end comprises a tail curvature around the elongate axis; and
    a strap connecting the first side edge to the second side edge, wherein the strap is configured to adjust a separation between the first side edge and the second side edge and to retain the sheet on the arm when worn.

2. The arm shield of claim 1, wherein the sheet is comprised of a plastic.

3. The arm shield of claim 1, wherein the strap is comprised of a first enlarged end and a second enlarged end, wherein both the first enlarged end and the second enlarged end are disposed on sides of the sheet opposite the elongate axis.

4. The arm shield of claim 3, wherein the sheet comprises a waist between the first end and the second end.

5. The arm shield of claim 1, wherein the strap is substantially elastic.

6. The arm shield of claim 1, wherein the sheet is translucent.

7. The arm shield of claim 1, wherein the sheet is comprised of at least a portion of a bottle.

8. The arm shield of claim 1, wherein the first end, second end, first side edge, and second side edge comprise a perimeter of the arm shield, and wherein the arm shield further comprises a protector disposed along at least a portion of the perimeter.

9. The arm shield of claim 8, wherein the protector is disposed along an entirety of the perimeter.

10. The arm shield of claim 8, wherein the protector comprises an adhesive tape.

11. An arm shield comprising:
    a sheet defining a first curvature about an elongate axis when worn on an arm, wherein the elongate axis is disposed on a bisecting plane wherein a first side portion of the sheet on a first side of the bisecting plane is a substantially mirror image of a second side portion of the sheet on a second side of the bisecting plane, and wherein the sheet comprises:
        a tapered nose portion, wherein the tapered nose portion comprises a second curvature of the sheet, wherein the second curvature is towards the elongate axis;
        a tail portion, wherein the tail portion comprises only the first curvature; and
    a retention strap comprising a first end connected to a portion of the sheet on a first side of the bisecting plane and a second end connected to a portion of the sheet on a second side of the bisecting plane, wherein the retention strap is configured to retain the sheet on the arm when worn.

12. The arm shield of claim 11, wherein the sheet is transparent.

13. The arm shield of claim 11, wherein the retention strap is elastic.

14. The arm shield of claim 11, wherein the sheet comprises a waist between the tapered nose portion and the tail portion.

15. The arm shield of claim 11, wherein the arm shield comprises a shield height from a bottom edge to an uppermost extent, and wherein the retention strap is connected to the first side portion at a strap height disposed at least about one-quarter of the shield height measured from the bottom edge.

16. The arm shield of claim 11, wherein the arm shield comprises a shield length from the nose portion to the tail portion, and wherein the retention strap is connected to the first side portion at a strap distance disposed at least about one-half of the shield length measured from the nose.

17. The arm shield of claim 11, wherein the arm shield comprises a perimeter and wherein the arm shield further comprises a perimeter protector disposed along at least a portion of the perimeter.

18. The arm shield of claim 17, wherein the perimeter protector is disposed along an entire length of the perimeter.

19. The arm shield of claim 17, wherein the perimeter protector comprises an adhesive tape.

20. The arm shield of claim 11, wherein the arm shield comprises at least a portion of a plastic bottle.

* * * * *